United States Patent [19]

Venn

[11] 3,970,940
[45] July 20, 1976

[54] OVERALL EQUIPMENT CONDITION CHECKING

[75] Inventor: Douglas A. Venn, Suitland, Md.

[73] Assignee: The United States of America as represented by the Secretary of the Navy, Washington, D.C.

[22] Filed: Jan. 28, 1960

[21] Appl. No.: 5,317

[52] U.S. Cl. ............................. 325/363; 324/73 R; 325/31; 325/133; 340/214; 340/224
[51] Int. Cl.² ......................................... H04B 17/00
[58] Field of Search ......................... 250/17.7, 20.8; 340/313, 314, 185, 410, 224, 253 M, 253 N; 324/73 AT, 73 R; 325/363, 31, 133

[56] References Cited
UNITED STATES PATENTS

| | | | |
|---|---|---|---|
| 2,408,878 | 10/1946 | Preston | 325/31 |
| 2,421,081 | 5/1947 | O'Brien | 325/31 |
| 2,842,753 | 7/1958 | Ewen | 340/313 |
| 2,877,344 | 3/1959 | Dodington | 250/17.7 |
| 3,034,707 | 5/1962 | Jefferson | 325/31 |

Primary Examiner—Howard A. Birmiel
Attorney, Agent, or Firm—R. S. Sciascia; Philip Schneider; Richard C. Reed

EXEMPLARY CLAIM

1. An electrical system for checking the operational state of a plurality of transmitters comprising,
   a. signal generating means,
   b. signal applying means for sequentially applying the output of said signal generating means to said plurality of transmitters,
   c. means for radiating the output of each of said transmitters,
   d. means for receiving the radiated energy,
   e. a coincidence detector,
   f. means for connecting said coincidence detector between said signal generating means and said receiving means, and
   g. an alarm circuit connected to said coincidence detector, whereby said alarm circuit will be actuated in the absence of a coincidence condition in said detector between the signal received from said generating means and the signal from said receiving means.

2 Claims, 3 Drawing Figures

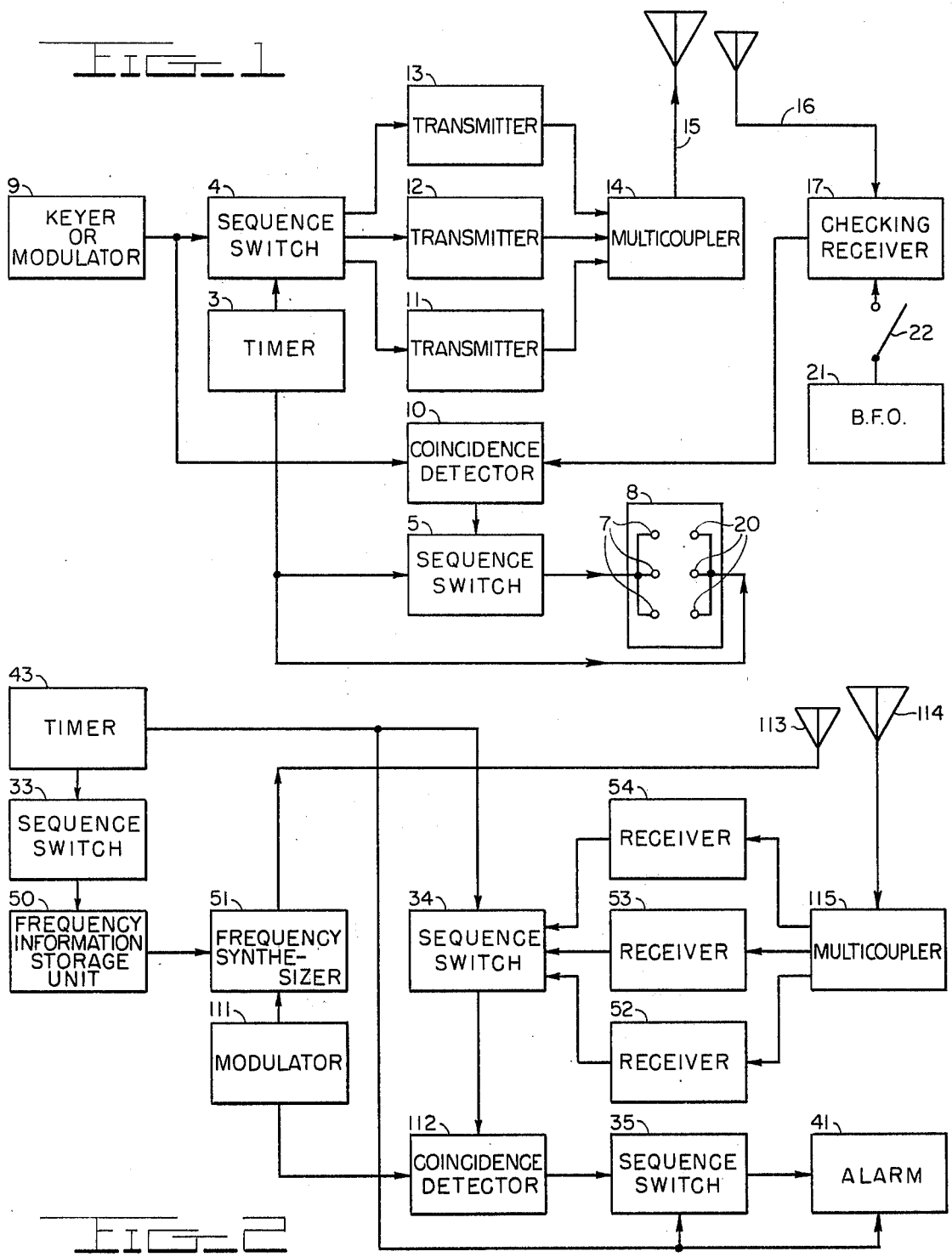

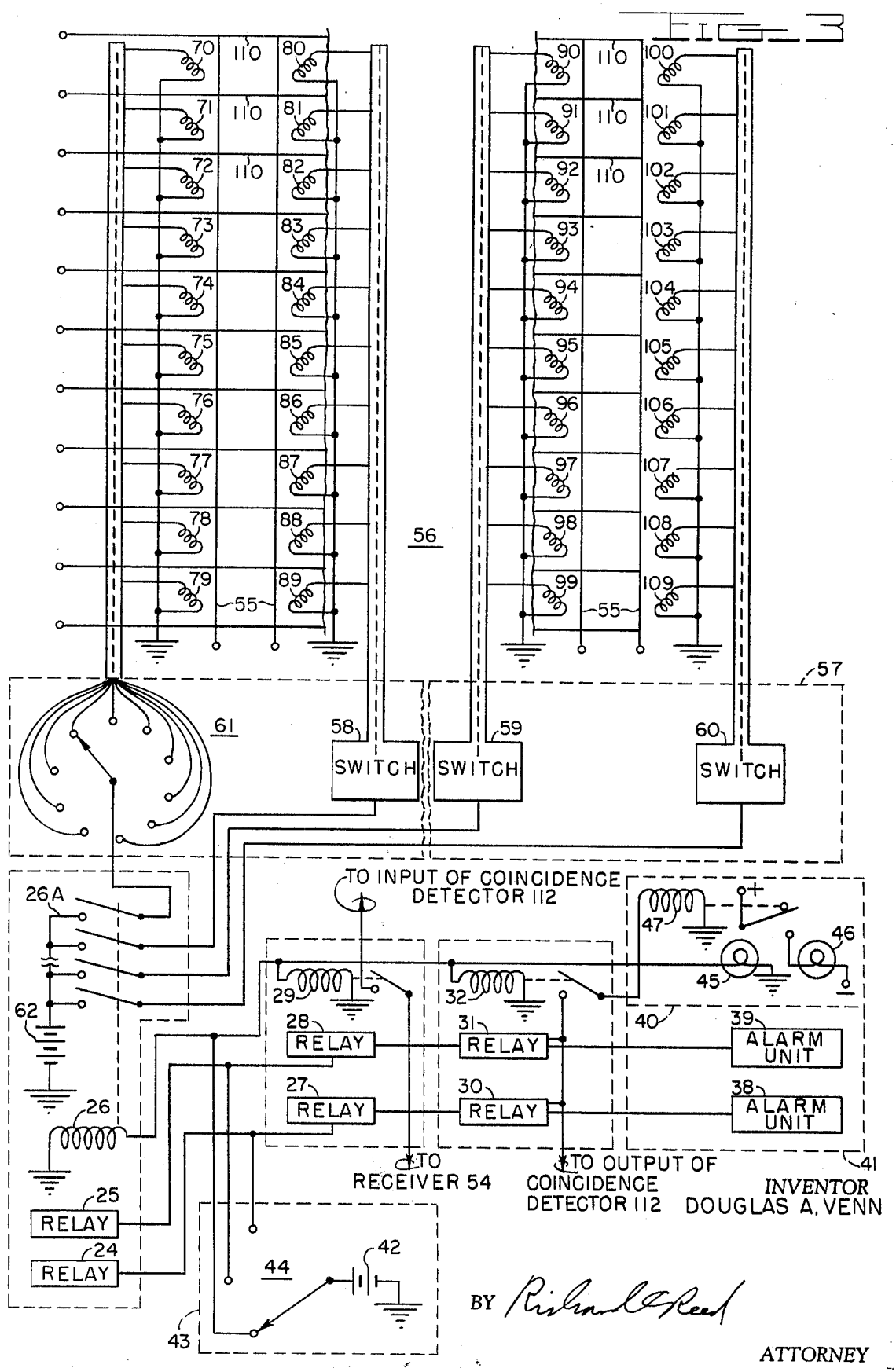

OVERALL EQUIPMENT CONDITION CHECKING

The invention described herein may be manufactured and used by or for the Government of the United States of America for governmental purposes without the payment of any royalties thereon or therefor.

This invention relates to an electrical testing system and in particular to one for sequentially testing the overall operating condition of several pieces of equipment.

In one system in the prior art, a local transmitter is checked by heterodyning the transmitted signals against the output of a monitor oscillator in the first detector of a local receiver. In another, the keying or modulating signals and part of the output of the transmitter are applied to a control unit and compared for supervisory purposes. These arrangements have the disadvantage that the monitoring unit can be used to check the operating condition of only a single piece of equipment.

Accordingly, it is an object of the present invention to provide an arrangement wherein a single monitoring unit may be used to sequentially check a plurality of equipments.

Another object is to provide a system for sequentially checking the operating condition of a plurality of equipments, e.g. receivers and transmitters, that are normally in standby operation.

Other objects of the present invention will be readily appreciated as the same becomes better understood by reference to the following detailed description when considered with the accompanying drawings in which like reference numerals designate like parts throughout the figures thereof and wherein:

FIG. 1 is a first embodiment of this invention.
FIG. 2 is a second embodiment.
FIG. 3 is a detail of the embodiment in FIG. 2.

In accordance with the teachings of the present invention, a test signal is sequentially applied to each of several equipments, and the output of each equipment and the test signal are applied to a coincidence detector. If the signal and the output from a particular equipment are not fed simultaneously to the coincidence detector, an alarm is activated indicating that the particular equipment is defective.

In one embodiment, the output of a modulator is applied to a coincidence detector and is sequentially applied to a plurality of transmitters. Part of the output of the transmitters, radiated by an antenna, is conducted to the coincidence detector through a checking receiver. If each signal from the modulator does not occur simultaneously in the detector with the signal associated with a respective transmitter, an alarm is energized indicating that the overall operating condition of the transmitter is defective.

In another embodiment, the output of a modulator is applied to a frequency synthesizer and a coincidence detector. A timer controls the synthesizer which sequentially transmits a plurality of frequencies from a probe located near a receiving antenna. The output of a plurality of receivers, each receiver being connected to the receiving antenna, is applied through a sequence switch to the coincidence detector. If each signal from the modulator does not occur simultaneously with the signal from a particular receiver, an alarm is energized indicating that the associated receiver is inoperative.

Referring to FIG. 1, timer 3 may be a motor driven rotary switch having a first arm, a respective contact to which each of sequence switches 4, 5 is connected, a second arm and a respective contact to which each light 20 in alarm 8 is connected. Each sequence switch may be a conventional rotary switch having a rotary arm stepped by a series of pulses provided by the timer and a contact for each transmitter to be tested. The output of keyer or modulator 9 is applied simultaneously to sequence switch 4 and coincidence detector 10. The input of each transmitter 11 to 13 is connected to sequence switch 4 and the output to multicoupler 14. Transmitting antenna 15 is connected to the multicoupler while receiving antenna 16, which may be a probe, is located in close proximity to the transmitting antenna. Checking receiver 17 is positioned between the receiving antenna and coincidence detector 10, which in a preferred embodiment is a conventional circuit applying a signal through sequence switch 5 to lights 7 in alarm 8 when a pair of signals do not occur simultaneously in the coincidence circuit. In the alarm, there is a pair of lights, one 7 and one 20, and an associated magnetic latching relay for each transmitter to be tested. Finally, frequency oscillator 21 may be fed to checking receiver 17 through switch 22.

In the operation of the embodiment in FIG. 1, timer 3 applies a series of pulses to sequence switches 4 and 5 operating the switches in sequence and at the same time sequentially energizing lights 20.

The particular light 20 that is energized in a given time interval indicates the transmitter under test. The output of modulator 9 is sequentially applied through sequence switch 4 to transmitters 11 to 13 so that the output of each transmitter, radiated by antenna 15, is picked up by antenna 16 and fed through checking receiver 17 to coincidence detector 10. If a signal from the modulator and one of the transmitters does not occur simultaneously in coincidence detector 10, one of the lights 7 in alarm 8 and the associated magnetic latching relay will be energized. The relay will maintain the light energized until mechanically released thereby indicating that a particular transmitter is defective.

Referring to FIGS. 2 and 3, relays 24 to 26, relays 27 to 29 and relays 30 to 32 are located in switches 33 to 35, respectively. Although three separate switches are shown, it is understood that one sequence switch with three arms in three decks of contacts could be used. Alarm units 38 to 40 are located in alarm 41. Source of d.c. potential 42 in timer 43 is applied simultaneously to one of the groups of relays 24, 27, 30 or 25, 28, 31 or 26, 29, 32 and one of the alarm units 38 to 40, depending upon the position of the arm in switch 44. Each alarm unit includes lights 45, 46 and a magnetic latching relay 47 connected in such a manner that light 45 is energized when its associated receiver is under test and light 46 is energized and latching relay 47 is activated to maintain light 46 energized when an alarm signal is provided by coincidence detector 112. The output of sequence switch 33 is conducted to frequency information storage unit 50 to control frequency synthesizer 51, which is disclosed in detail in copending application Ser. No. 784,404 entitled "Coordinate System Frequency Synthesizer" and filed Dec. 31, 1958 by Robert R. Stone, Jr. now U.S. Pat. No. 3,119,078 dated Jan. 21, 1964. The frequency information storage unit 50 includes a plurality of banks of switches, one for each receiver 52 to 54 to be tested, each bank having one switch for each of the ten vertical bars 55 in cross bar switch 56 located in the frequency synthesizer 51.

By way of illustration, one bank of switches 57, comprising switches 58 to 60, represented as hollow boxes, are identical with switch 61 which has a common arm and ten contacts. When each contact of switch 61 is closed, a circuit is completed from source of d.c. potential 62 through armature 26A, when relay 26 is energized, a respective one of relays 70 to 79 to ground. In a similar manner, each of switches 58 to 60 controls a respective one of the groups of relays 80 to 89, 90 to 99, and 100 to 109. Since relays 70 to 109 are each associated with a respective contact on switches 58 to 61 and control an intersection between one of the vertical bars 55 and a respective one of the horizontal bars 110, the position of switches 58 to 61 determines the frequency that is generated by frequency synthesizer 51 when switch 44 is positioned to energize relay 26. It is apparent that each bank of switches in frequency information storage unit 50 may be positioned to operate frequency synthesizer 51 to obtain a desired frequency during the time interval when the associated relay in sequence switch 33 is energized. It is understood that other types of frequency synthesizers may be used and that other types of frequency information storage units may be employed. For example, a tape programmer and release drive may be connected between sequence switch 33 and the relays controlling the cross-bar switch in frequency synthesizer 51.

Modulator 111 is connected between frequency synthesizer 51 and coincidence detector 112. The output of the frequency synthesizer is applied to antenna probe 113 located near receiving antenna 114. The latter is connected to receivers 52 to 54 through multicoupler 115, the output of each receiver is applied through the contacts of a respective one of relays 27 to 29 in sequence switch 34 to the input of coincidence detector 112. The coincidence detector may be any conventional circuit which will generate a signal to energize the latching relay 47 in one of the alarm units 38 to 40 when a signal from a respective one of the receivers 52 to 54 is not applied simultaneously with a signal from modulator 111 and the relay, associated in the sequence switch 35 with the receiver under test, is energized.

In the operation of the embodiment in FIGS. 2 and 3, each of the bank of switches in frequency information storage unit 50 is set at the same frequency as an associated one of receivers 52 to 54. As the arm of switch 44 rotates clockwise in FIG. 3, lights 45 in alarm units 38 to 40 are sequentially operated indicating the receiver under test and relays 24 to 26 are energized operating the banks of switches controlling frequency synthesizer 51 which generates the frequencies to which the receivers are adjusted. Each of these frequencies, radiated by antenna 113, is received by probe 114 and fed through a respective one of receivers 52 to 54 and sequence switch 34, which is synchronized in operation with switch 33, to coincidence detector 112.

If, for example, a signal from modulator 111 and receiver 54 do not occur simultaneously in coincidence detector 112 the coincidence detector provides a signal which is applied through the closed contact of relay 32 to magnetic latching relay 47. This energizes the relay and light 46 which remain energized until the relay is mechanically released indicating that receiver 54 is defective.

Obviously many variations of the present invention are possible in the light of the above teachings. It is therefore to be understood that within the scope of the appended claims, the invention may be practiced otherwise than as specifically described.

What is claimed is:

1. An electrical system for checking the operational state of a plurality of transmitters comprising,
    a. signal generating means,
    b. signal applying means for sequentially applying the output of said signal generating means to said plurality of transmitters,
    c. means for radiating the output of each of said transmitters,
    d. means for receiving the radiated energy,
    e. a coincidence detector,
    f. means for connecting said coincidence detector between said signal generating means and said receiving means, and
    g. an alarm circuit connected to said coincidence detector, whereby said alarm circuit will be actuated in the absence of a coincidence condition in said detector between the signal received from said generating means and the signal from said receiving means.

2. An electrical testing system for checking the operational state of a plurality of signal receivers comprising,
    a. signal generating means,
    b. first sequence means for sequentially operating said signal generating means to provide a plurality of frequencies,
    c. means connected to the output of said signal generating means for radiating said frequencies,
    d. a plurality of receivers each connected to receive said radiated frequencies,
    e. a coincidence detector,
    f. means for sequentially applying the output of said signal generating means and the output of each of said receiving means to said coincidence detector,
    g. an alarm circuit, and
    h. means connecting said alarm circuit to said coincidence detector whereby upon detection by said coincidence detector of the absence of a coincidence condition between the output of said signal generating means and the output of each of said receivers, said alarm means will be actuated.

* * * * *